United States Patent
Suzuki

(10) Patent No.: US 9,849,425 B2
(45) Date of Patent: Dec. 26, 2017

(54) METHOD FOR SUBSTITUTING TRITIUM IN TRITIUM-CONTAINING WATER, AND TRITIUM ELIMINATION METHOD

(71) Applicant: PCS CO., LTD., Sapporo-shi, Hokkaido (JP)

(72) Inventor: Toshikatsu Suzuki, Sapporo (JP)

(73) Assignee: PCS CO., LTD., Hokkaido (JP)

( * ) Notice: Subject to any disclaimer, the term of this patent is extended or adjusted under 35 U.S.C. 154(b) by 0 days.

(21) Appl. No.: 15/321,108

(22) PCT Filed: Jul. 3, 2015

(86) PCT No.: PCT/JP2015/069299
§ 371 (c)(1),
(2) Date: Dec. 21, 2016

(87) PCT Pub. No.: WO2016/002938
PCT Pub. Date: Jan. 7, 2016

(65) Prior Publication Data
US 2017/0128886 A1     May 11, 2017

(30) Foreign Application Priority Data
Jul. 3, 2014   (JP) .................. 2014-138149

(51) Int. Cl.
*B01D 59/28*     (2006.01)
*B01J 20/20*     (2006.01)
(Continued)

(52) U.S. Cl.
CPC .............. *B01D 59/28* (2013.01); *B01J 20/18* (2013.01); *B01J 20/20* (2013.01); *B01J 20/22* (2013.01);
(Continued)

(58) Field of Classification Search
CPC . B01D 59/28; B01J 20/18; B01J 20/20; B01J 20/22; B01J 20/28016;
(Continued)

(56) References Cited

U.S. PATENT DOCUMENTS

| 4,020,003 A | 4/1977 | Steinberg et al. |
| 2009/0093664 A1 | 4/2009 | Wang |
| 2010/0021372 A1 | 1/2010 | Bonnett et al. |

FOREIGN PATENT DOCUMENTS

| EP | 00265744 A2 | 5/1988 |
| JP | S57-017898 A | 1/1982 |

(Continued)

OTHER PUBLICATIONS

Hughes, Jerry W. Jr, "A Device for Tritium Enrichment of Glow Discharge Polymer Inertial Confinement Fusion Targets", Massachusetts Institute of Technology, 1999.
(Continued)

*Primary Examiner* — Dirk Bass
(74) *Attorney, Agent, or Firm* — Oliff PLC

(57) ABSTRACT

A tritium substitution method having a process of adding an organic substance including at least one of an organic acid, an organic acid alkali salt, a water-soluble amino acid, an organic acid to which a water-soluble amino acid alkali salt is added, an organic acid alkali salt, a water-soluble amino acid, and a water-soluble amino acid alkali salt, to radioactive substance-contaminated water containing tritium, a tritium substitution process of circulating fine bubbles in the contaminated water in which the organic substance has been added to cause a reaction of substituting hydrogen in the α position of a carboxylic acid group by tritium through an interface of the fine bubbles to produce a tritium-substituted product.

13 Claims, 2 Drawing Sheets

(51) Int. Cl.
*G21F 9/10* (2006.01)
*B01J 20/22* (2006.01)
*B01J 20/28* (2006.01)
*G21F 9/12* (2006.01)
*C02F 9/00* (2006.01)
*B01J 20/18* (2006.01)
*C02F 1/54* (2006.01)
*C02F 1/24* (2006.01)
*C02F 1/52* (2006.01)
*C02F 1/28* (2006.01)
*C02F 11/00* (2006.01)
*C02F 101/00* (2006.01)

(52) U.S. Cl.
CPC ........... *B01J 20/28016* (2013.01); *C02F 9/00* (2013.01); *G21F 9/10* (2013.01); *G21F 9/12* (2013.01); *C02F 1/24* (2013.01); *C02F 1/28* (2013.01); *C02F 1/5236* (2013.01); *C02F 1/54* (2013.01); *C02F 11/008* (2013.01); *C02F 2101/006* (2013.01); *C02F 2305/04* (2013.01)

(58) Field of Classification Search
CPC .. C02F 11/008; C02F 1/24; C02F 1/28; C02F 1/5236; C02F 1/54; C02F 2101/006; C02F 2305/04; C02F 9/00; G21F 9/10
See application file for complete search history.

(56) References Cited

FOREIGN PATENT DOCUMENTS

| | | |
|---|---|---|
| JP | H07-70018 A | 3/1995 |
| JP | 2007-155355 A | 6/2007 |
| JP | 2009-012939 A | 1/2009 |
| JP | 2009-021838 A | 1/2009 |
| JP | 2009-125907 A | 6/2009 |
| JP | 2009-236893 A | 10/2009 |
| JP | 2010-006637 A | 1/2010 |
| JP | 2010-195755 A | 9/2010 |
| JP | 2013-083616 A | 5/2013 |
| JP | 2013-178152 A | 9/2013 |
| JP | 2014-077675 A | 5/2014 |
| JP | 2015-081840 A | 4/2015 |

OTHER PUBLICATIONS

Jacobs, D. G., "Sources of tritium and its behavior upon release to the environment", U. S. Atomic Energy Commission/Division of Technical Information, Health Physics Division, Nuclear Safety Information Center, Oak Ridge National Laboratory, Dec. 1968.
Rydberg, Jan et al., "Radiation Induced Tritium Labeling of p-Aminosalicylic Acid (PAS)", Acta Chemica Scandinavica, 1958, vol. 12, No. 2, pp. 332-339.
Donato, L. et al., "Labelled Proteins in Tracer Studies", Proceedings of the Conference on Problems connected with the Preparation and Use of Labelled Proteins in Tracer Studies, Jan. 17-19, 1966, European Atomic Energy Community—EURATOM, Oct. 1966.
Hamada, Masayuki et al., "The Stereochemistry of Tritium Labeling of Hexachlorocyclohexane Isomers. I:Gas Exposure Method (Commemoration Issue Dedicated to Professor Minoru Ohno on the Occasion of his Retirement)", Bulletin of the Institute for Chemical Research, Kyoto University Sep. 30, 1972, vol. 50, No. 3, pp. 175-182.
Florini, James R., "Isolation and Characterization of a Tritium-exchange Labeled Synthetic Corticosteroid", The Journal of Biological Chemistry, Feb. 1960, vol. 235, No. 2, pp. 367-370.
Lively, Mark O. et al., "Low Pressure Tritiation of Proteins", The Journal of Biological Chemistry, Jan. 25, 1979, vol. 254, No. 2, pp. 262-264.
Yavorsky, Paul M. et al., "New Method of Tritium Labeling of Pure Compounds and Coal Derivatives", Research and Development Division, Consolidation Coal Company Library, Pennsylvania, Jan. 1, 1962, pp. 12-28.
Steinberg, D. et al., "The Preparation of Tritiated Proteins by the Wilzbach Method and a Simple Method for Liquid Scintillation Counting of Radioactive Proteins", Liquid Scintillation of Spectrometry 1957, Laboratory of Cellular Physiology and Metabolism, National Institutes of Health, National Heart Institute, 1957, pp. 230-236.
Nov. 2, 2015 Search Report issued in International Patent Application No. PCT/JP2015/069299.
Jan. 3, 2017 International Preliminary Report on Patentability issued in International Patent Application No. PCT/JP2015/069299.
Konishi, Satoshi, "Tritium no Bunri", Tritium Kenkyukai-Tritium to sono Toriatsukai o Shiru Tameni-, Mar. 4, 2014, pp. 29-38.
Jun. 7, 2016 Office Action issued in Japanese Patent Application No. 2014-138149.
Sep. 13, 2016 Office Action issued in Japanese Patent Application No. 2014-138149.
Oct. 11, 2016 Notice of Allowance issued in Japanese Patent Application No. 2014-138149.

FLOSS DEHYDRATED SUBSTANCE STORAGE TANK

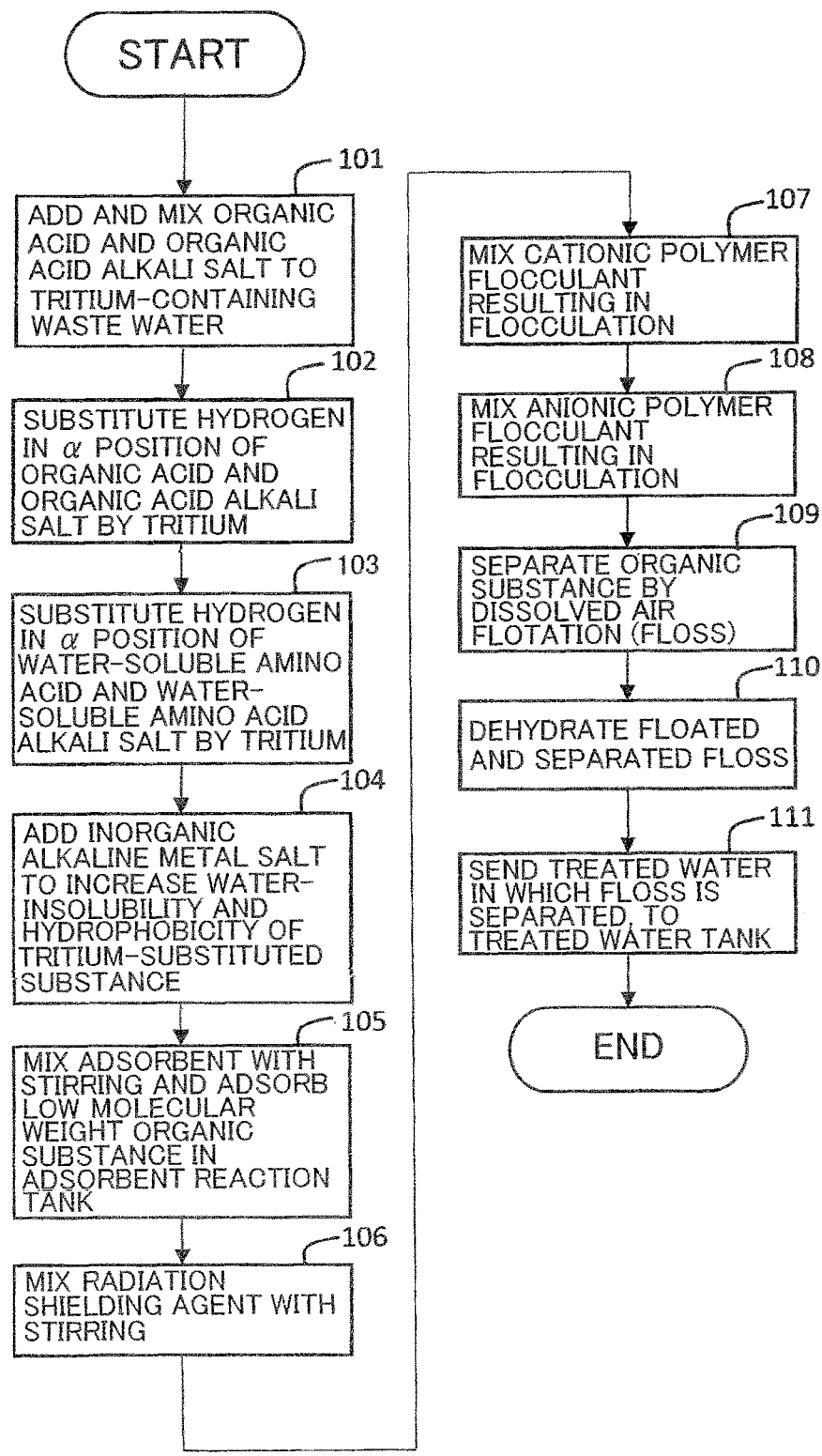

METHOD FOR SUBSTITUTING TRITIUM IN TRITIUM-CONTAINING WATER, AND TRITIUM ELIMINATION METHOD

TECHNICAL FIELD

The present invention relates to a method for substituting tritium in tritium-containing water that is discharged due to an accident at an atomic power station, and the like, and a tritium elimination method.

BACKGROUND ART

When tritium-containing contaminated water is generated by radioactive contamination, a separation operation of tritium is difficult due to properties of tritium, and an effective means of eliminating tritium except for low-temperature distillation and storage and sequestration that require a large-scale facility has not been found.

A simple storage method is hardly a realistic means. This is because organic substances such as sealing materials and metals in a structure of a storage tank are deteriorated due to an ionization phenomenon that is a characteristic of radioactively contaminated water, and high cost is required for storage and transport.

A method capable of mechanically treating tritium waste water containing various materials is significantly required.

For example, a procedure of applying a label to tritium by the Wilzbach method and then eliminating tritium is considered.

Specifically, a labeled compound known as an isotope in a medical field is synthesized from various kinds of organic compound due to the reactivity of tritium and utilized in medical site and study. The Wilzbach method that is a procedure known as tritium labeling has long history, and has various knowledge. This procedure is a method of bringing a tritium gas into contact with an organic compound for a certain time, and is basically simple. By this procedure, tritium-labeled compounds are produced from various organic compounds. Therefore, the reactivity of tritium is high in a sense. However, the Wilzbach method is effective under an environment where the radioactivity concentration is high and a radioactive substance is only tritium. Furthermore, the method has a problem in which various tritium-substituted organic compounds are simultaneously produced as impurities that are not a target compound, by decay of tritium in which a (ray is emitted.

CITATION LIST

Patent Literature

Patent Literature 1: Japanese Patent Application Laid-Open No. 2007-155355
Patent Literature 2: Japanese Patent Application Laid-Open No. 2009-12939
Patent Literature 3: Japanese Patent Application Laid-Open No. 2009-125907
Patent Literature 4: Japanese Patent Application Laid-Open No. 2009-236893
Patent Literature 5: Japanese Patent Application Laid-Open No. 2009-21838
Patent Literature 6: Japanese Patent Application Laid-Open No. 2010-6637

Non-Patent Literature

Non Patent Literature 1: Jerry W. Hughes, Jr.: "A Device for Tritium Enrichment of Glow Discharge Polymer Inertial Confinement Fusion Targets", Massachusetts Institute of Technology (1999 May 7)
Non Patent Literature 2: D. G. Jacobs, Health Physics Division, Nuclear Safety Information Center, Oak Ridge National Laboratory: "Sources of tritium and its behavior upon release to the environment", U. S. ATOMIC ENERGY COMMISSION/Division of Technical Information (1968 December)
Non Patent Literature 3: JAN RYDBERG, AKE HANNGREN: "Radiation Induced Tritium Labeling of p-Aminosalicylic Acid (PAS)" (1958 December)
Non Patent Literature 4: L. DONATO, G. MILHAUD, J. SIRCHIS: LABELLED PROTEINS IN TRACER STUDIES, European Atomic Energy Community—EURATOM (1966 October)
Non Patent Literature 5: Hamada, Masayuki, Kawano, Eiko: "The Stereochemistry of Tritium Labeling of Hexachlorocyclohexane Isomers. I:Gas Exposure Method (Commemoration Issue Dedicated to Professor Minoru Ohno On the Occasion of his Retirement)", Bulletin of the Institute for Chemical Research, Kyoto University (1972 Sep. 30)
Non Patent Literature 6: James R. Flotini: "Isolation and Characterization of a Tritium-exchange Labeled Synthetic Corticosteroid", J. Biol. Chem. (1960 February)
Non Patent Literature 7: Mark Oliver Lively: "LOW PRESSURE TRITIATION OF PROTEINS", Georgia Institute of Technology (1978 August)
Non Patent Literature 8: Paul M. Yavorsky, Everett Gorin: "New Method of Tritium Labeling of Pure Compounds and Coal Derivatives", Research and Development Division, Consolidation Coal Company, Library, Pa.
Non Patent Literature 9: D. STEINBERG, M. VAUGHAN, C. B. ANFINSEN, J. D. GORRY, J. LOGAN: "THE PREPARATION OF TRITIATED PROTEINS BY THE WILZBACH METHOD AND A SIMPLE METHOD FOR LIQUID SCINTILLATION COUNTING OF RADIOACTIVE PROTEINS", Laboratory of Cellular Physiology and Metabolism, National Institutes of Health, National Heart Institute
Non Patent Literature 10: D. G. Jacobs, Health Physics Division, Nuclear Safety Information Center, Oak Ridge National Laboratory: "Sources of tritium and its behavior upon release to the environment", U. S. ATOMIC ENERGY COMMISSION/Division of Technical Information (1968 December)

SUMMARY OF INVENTION

Technical Problem

An object of the present invention is to provide a method for substituting tritium that enables elimination of tritium from water contaminated with a radioactive substance at a downstream step, and a tritium elimination method capable of continuously and mechanically treating contaminated water containing tritium.

Solution to Problem

The present invention provides a method for eliminating tritium by a method including substituting hydrogen in the α position of a carboxylic acid in an organic acid and an organic acid alkali salt that have hydrogen in the α position, as an organic substance, by tritium, and separating the substituted substance from contaminated water by a dissolved air flotation treatment, and a method capable of continuously and mechanically treating contaminated water containing tritium. Further, the present invention provides a method for eliminating tritium by a method including substituting hydrogen in the α position of a water-soluble amino acid and a water-soluble amino acid alkali salt that have hydrogen in the α position, as an ampholyte, by tritium to produce a tritium-labeled compound, and separating the tritium-labeled compound from the contaminated water by a dissolved air flotation treatment.

Moreover, the present invention provides a method for advancing a drainage treatment while an operator and a mechanical system are protected using a radioactivity protection effect of a shielding material by the following procedures including: a method of flocculating a radioactive tritium-substituted organic substance with calcium chloride, ferric chloride, ferrous sulfate, an inorganic metal salt, and an inorganic alkali metal salt that are a metal salt; a method of flocculating the radioactive tritium-substituted organic substance with an inorganic flocculant and a polymer flocculant after activated carbon, zeolite, a molecular sieve, CNT, or CNT nanopeapod is mixed with stirring; and a method of mixing powders of a calcium material (calcium chloride, quick lime, and slaked lime), a mineral such as a silica mineral and a barium mineral, a titanium compound, or barium sulfate with contaminated water to flocculate with a polymer flocculant while adjusting the shielding effect to obtain a stable flocculated substance.

By this method, tritium can be separated from tritium-contaminated water without providing a large-scale facility for low-temperature distillation or a large storage tank for storing contaminated water. In addition, while radiation is shielded, tritium can be concentrated and stored in a narrow space in a state in which tritium can be actually handled.

The method of the present invention has an important advantage in which an operation environment can be systematically established under prevention of external exposure. The method of the present invention has excellent viability of a device for treating tritium and a related radioactive substance, and can contribute to development of industry.

The present invention provides an effective treatment means for a drainage treatment at an atomic power station, in which the concentration at present in Japan is 670,000,000 Bq.

In the present invention, tritium-containing waste water is treated by a process described below.

At an accident at the atomic power station, contaminated water containing a high concentration of a nuclide with long half-time, such as cesium, strontium, and tritium, is generated actually. In order to suppress an influence of the nuclide on the environment, the contaminated water is stored. However, when the accident is a large-scale accident, the amount of radioactive waste water to be generated is significantly increased. In this case, sequestration by storage may not be realized. Therefore, a safe treatment is required during generation of a large amount of contaminated water.

In a general water treatment, purification is advanced by physically, chemically, and biologically eliminating contaminants in turn. However, in a treatment of radioactive waste water, it is difficult to approach the radioactive waste water which is constantly dangerous.

In an operation technique for a water treatment device in accordance with a general procedure, a flocculation treatment, a membrane treatment, and the like are used at an actual process for a purification method of sequentially eliminating contaminants out of a system. In a case of waste water that is a mixture of radioactive waste materials, it is generally known that cesium and strontium are relatively easily eliminated, but elimination of tritium by a basic purification method as a water treatment is difficult. This is because the ratio of tritium present in a form of tritium water in the waste water is increased due to chemical equilibrium.

In order to solve the problems, the present invention has been made by scanning chemical equilibrium, properties of other radioactive substances, and reactions, and redesigning the purification method.

In the present invention, these problems are solved by the following consideration.

The equilibrium of tritium at normal temperature under this environment is as follows.

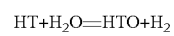

$HT+H_2O \rightleftharpoons HTO+H_2$

When an equilibrium constant is about 6 at normal temperature of 25°, the equilibrium actually shifts to a direction of producing tritium water.

Equilibrium Constant for the Reaction

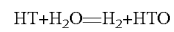

$HT+H_2O \rightleftharpoons H_2+HTO$

| Temperature °C. | Observed equilibrium constant | Theoretical equilibrium constant |
|---|---|---|
| 16.0 | 6.75 + 0.04 | 6.47 |
| 20.2 | 6.47 + 0.02 | 6.24 |
| 25.0 | 6.25 + 0.05 | 6.01 |
| 56.2 | 5.05 + 0.05 | 4.84 |
| 79.6 | 4.37 + 0.05 | 4.23 |
| 111.2 | 3.76 + 0.04 | 3.64 |
| 158.4 | 3.10 + 0.06 | 3.03 |
| 212.2 | 2.64 + 0.04 | 2.54 |
| 302.9 | 2.17 + 0.02 | 2.08 |

In the present invention, this shift of the equilibrium, but not low-efficient separation and elimination of a tritium gas, is used for a water treatment of tritium water.

In the present invention, various tritium-substituted organic compounds that are simultaneously produced as impurities are captured by an adsorbent such as activated carbon, zeolite, a molecular sieve, CNT, and CNT nanopeapod.

By a procedure of general advanced water treatment technique that is currently performed for cesium and strontium, which are nuclides to be easily eliminated as contaminants from a mixture of cesium, strontium, and tritium that is waste water of radioactive waste materials, tritium is finally left. Therefore, water itself is left as a tritium contaminant. Accordingly, the procedure of successively eliminating the contaminants is not appropriate. This procedure is seemingly reasonable, but there is another reasonable treatment method.

In the present invention, an organic compound having appropriate physical properties is first added to waste water, and reacted with tritium. Thus, hydrogen of the organic compound is substituted by tritium. Unlike a conventional method, the waste water is "contaminated" with the organic compound to be reacted with tritium, to form an environment where a gas and a liquid is mixed. Tritium is eliminated by the following method. In this case, when the radioactivity concentration is high and close to the radioactivity concentration at a test in which the Wilzbach method is performed, substitution is easier.

In the present invention, an organic acid, an organic acid alkali salt, a water-soluble amino acid, and a water-soluble amino acid alkali salt that have hydrogen in the α position are selected as an organic substance to be added to tritium waste water, added, and reacted with an inorganic salt using the foamability of these compounds. Thus, a function capable of adjusting water-insolubility and hydrophobicity is utilized.

Advantageous Effects of Invention

Tritium is a nuclide emitting a weak β ray. At a power station, tritium is also generally released in the air in many cases. From various types of knowledge, it is known that tritium is partially taken into the body and substituted by hydrogen of the gene to cause various disorders. As the disorders, not only ovarian disorders but also increase in neonatal genetic abnormality and abnormal development are known. There are some facts in which a certain percentage of contamination of employees worked at atomic power stations with radioactive substances is caused by tritium and tritium is pointed out to be dangerous. Therefore, establishment of a useful handling method is increasingly required.

It is already known that tritium tends to shift to the right side in the reaction described below at atmospheric pressure and normal temperature. The amount of tritium present in a form of tritium-substituted water is increased in a town, and tritium in waste water decays and becomes radioactive. For this reason, a technique of certainly eliminating tritium in the waste water is required.

The present invention has the following effects:
(1) tritium-contaminated water can be continuously treated while safety of an operation is secured.
(2) a systematic treatment based on control of radiation by an operation chief can be performed actually for a development state of an operation. Specifically, a step of capturing tritium, a step of adjusting reactivity such as a shielding effect, and adjustment of a holding state of a dehydrated substance can be individually and clearly adjusted.

Since the method of the present invention is simple, treatment and safe control of tritium are facilitated.

BRIEF DESCRIPTION OF DRAWINGS

FIG. 2 is a flow chart showing a process of eliminating tritium in the embodiment

DESCRIPTION OF EMBODIMENTS

Figure 1:
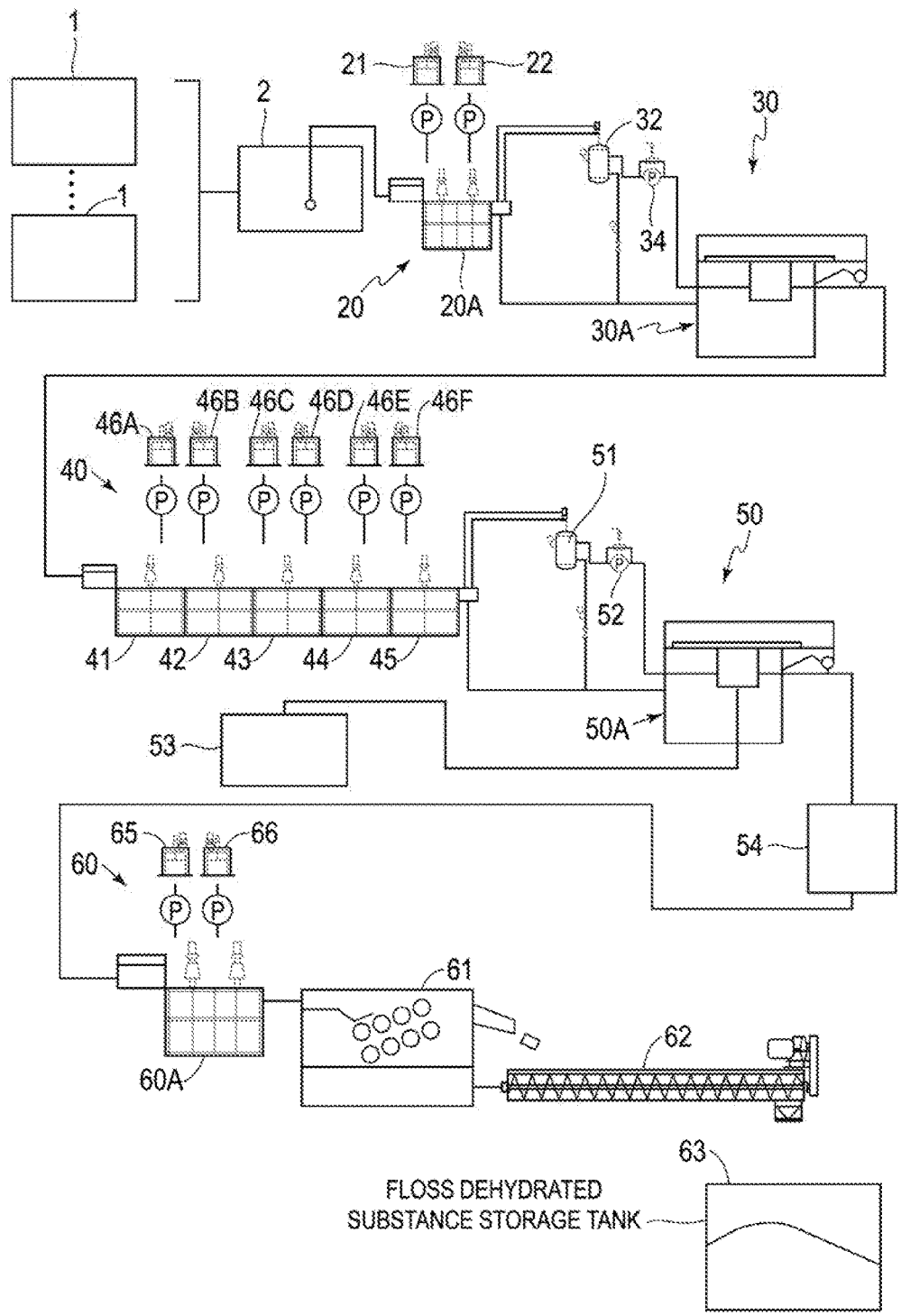
FIG. 1 is a block diagram showing a configuration of a tritium elimination device for performing a tritium elimination method according to an embodiment of the present invention.

Hereinafter, an embodiment of the present invention will be described with reference to FIG. 1.

Embodiment

A tritium elimination device 10 for performing a method for substituting tritium in tritium-containing water and a tritium elimination method according to this embodiment includes an organic substance mixing device 20, a substitution reaction device 30, a flocculation-adsorption reaction device 40, a dissolved air flotation separation device 50, and a floss treatment device 60. Tritium-contaminated water supplied from a tritium waste water storage tank 1 through a tritium waste water supply tank 2 is treated and separated into treated water and floated floss containing tritium water.

The organic substance mixing device 20 includes an organic substance mixing tank 20A, and an organic acid feeder 21 and an amino acid feeder 22 that supply an organic acid and an amino acid, respectively, to the organic substance mixing tank 20A.

The substitution reaction device 30 includes a fine bubble-type Wilzbach reaction tank 30A, a pressurized water tank 32, and a pressurized water pump 34. Fine bubbles are added to pressurized water in the pressurized water tank 32 by the pressurized water pump 34, and the pressurized water is supplied to the fine bubble-type Wilzbach reaction tank 30A.

The flocculation-adsorption reaction device 40 includes a reaction tank 41 for an inorganic salt, an inorganic alkali metal salt, an inorganic metal salt, and an inorganic flocculant (hereinafter, inorganic flocculation tank), an adsorbent reaction tank 42 for fine powder activated carbon, zeolite, a molecular sieve, CNT, and CNT nanopeapod (hereinafter, adsorbent reaction tank), a shielding agent mixing reaction tank 43, a cationic polymer flocculant reaction tank 44, and an anionic polymer flocculant reaction tank 45, in this order from a side of the fine bubble-type Wilzbach reaction tank 30A.

To the inorganic flocculation tank 41, each flocculant is supplied from a feeder 46A for an inorganic salt, an inorganic metal salt, an inorganic alkali metal salt, and an inorganic flocculant.

To the adsorbent reaction tank 42, fine powder activated carbon, zeolite, and the like are supplied from a fine powder activated carbon feeder 46B. To the shielding agent mixing reaction tank 43, a radioactive substance-shielding agent is supplied from a radioactive substance-shielding agent feeder 46C, and a polymer flocculant is supplied from a polymer flocculant feeder 46D.

To the cationic polymer flocculant reaction tank 44, a polymer flocculant is supplied from a polymer flocculant feeder 46E. To the anionic polymer flocculant reaction tank 45, a surfactant is supplied from an anionic activating agent feeder 46F.

The dissolved air flotation separation device 50 includes a dissolved air flotation separation tank 50A, a pressurized water tank 51, and a pressurized water pump 52. Highly pressurized water that contains fine bubbles generated by the pressurized water tank 51 and the pressurized water pump 52 is supplied to the dissolved air flotation separation tank 50A.

A numeral 53 in FIG. 1 shows a first unit treated water tank for storing primary treated water after eliminating floated floss in the dissolved air flotation separation tank 50A.

The floss treatment device 60 includes a floss flocculation reaction tank 60A, a floss dehydrator 61, a floss dehydrated substance conveyor 62, and a floss dehydrated substance storage tank 63.

The floss adjustment tank 64 is a tank of temporarily storing the floated floss that is separated in the dissolved air flotation separation tank 50A. From the floss adjustment tank 64, the floated floss is sent to the floss flocculation reaction tank 60A. To the floss flocculation reaction tank 60A, a polymer flocculant is supplied from polymer flocculant feeders 65 and 66 in two steps.

Next, a process of eliminating tritium from tritium-containing waste water by the substitution reaction device 30, the flocculation-adsorption reaction device 40, and the dissolved air flotation separation device 50 will be described with reference to FIG. 2.

In the organic substance mixing tank 20A, an organic acid and an organic acid alkali salt are mixed in tritium-containing waste water supplied from the tritium waste water supply tank 2 (Step 101). Tritium and the organic acid are circulated in the fine bubble-type Wilzbach reaction tank 30A of continuously generating fine bubbles, to cause a substitution reaction of tritium with hydrogens in the α position of the organic acid and the organic acid alkali salt (Step 102). A water-soluble amino acid and a water-soluble amino acid alkali salt are simultaneously or separately added to substitute hydrogens in the α position of the water-soluble amino acid and the water-soluble amino acid alkali salt by tritium (Step 103).

Subsequently, calcium chloride, ferric chloride, ferrous sulfate, an inorganic metal salt, and an inorganic alkali metal salt are added and mixed in the inorganic flocculation tank 41, to increase water-insolubility or hydrophobicity of the tritium-substituted organic acid and tritium-substituted amino acid (Step 104).

In formation of fine floc due to the increased hydrophobicity of tritium-substituted organic acid metal salt and tritium-substituted organic acid alkali metal salt that are obtained by addition of an inorganic salt, an inorganic flocculant, an inorganic metal salt, and an inorganic alkaline metal salt in the inorganic flocculation tank 41, a tritium-substituted organic substance having formability is a solid body of the organic acid metal salt, organic acid calcium, organic acid aluminum, amino acid metal salt, amino acid calcium, and amino acid aluminum, or the tritium-substituted organic substance having foamability is likely to be flocculated due to increased hydrophobicity.

In the adsorbent reaction tank 42, various low molecular weight organic substances obtained by the reaction of tritium are adsorbed by mixing an adsorbent such as fine powder activated carbon and fine powder zeolite with stirring. A compound to be adsorbed herein is removed from water into a solid phase of the adsorbent by adsorbing various decay compounds obtained by radiation of a β ray and tritium-substituted compounds (Step 105).

Next, in the shielding agent mixing reaction tank 43, a radiation shielding agent is mixed with stirring (Step 106). Herein, fine powder of a radioactive substance shielding agent is mixed with a radioactive substance of deposited solid phase. A shielding material to be used is a powder or slurry of shielding material having a radiation shielding effect, such as a barium mineral, a calcium-containing mineral, zeolite, and clay.

At Step 107, a polymer flocculant is mixed resulting in flocculation in the cationic polymer flocculation reaction tank 44. At Step 108, a polymer flocculant is mixed resulting in flocculation in the anionic polymer flocculation reaction tank 45.

At Step 109, the flocculated substance of the tritium-substituted organic acid metal salt and the tritium-substituted alkali metal salt is floated and separated in the dissolved air flotation separation tank 50A. In floating and separation in a dissolved air flotation facility, an organic substance having slight hydrophobicity is completely floated and separated at a level for practical use, and clear treated water is obtained.

Subsequently, floated and separated floss in the dissolved air flotation separation tank 50A is dehydrated by the floss dehydrator 61 (Step 110). The floss dehydrator is an already existing dehydrator, and in particular, such a device that scattered water droplets are not generated in the periphery of a dehydration facility. For example, the floss dehydrator includes a multiplex disc dehydrator, a belt-type dehydrator, a screw press shielded by a partition, and the like. This dehydration step is performed every treatment unit, and a handling and control condition for a dehydrated radioactive substance can be changed according to every treatment unit.

At Step 111, the treated water in the dissolved air flotation facility is sent to the first unit treated water tank 53. Thus, a treatment unit at a first stage is completed. According to a situation on the site, a treatment process of a second treatment unit in which the first unit treated water tank 53 is considered as the tritium waste water supply tank 2 is configured. Similarly, the tritium concentration is decreased to a level suitable for a drainage treatment process that is generally performed.

In the Wilzbach reaction in the method of the embodiment, the treatment efficiency is high as a whole since various tritium-substituted organic substances as impurities are captured by activated carbon and zeolite, and tritium-substituted olefins that are formed during a radical reaction and are insoluble in water are also captured by activated carbon, zeolite, a molecular sieve, CNT, and CNT nanopeapod at the process. However, the yield of tritium substitution is varied depending on the amounts of the organic substances added and conditions of the site. Therefore, this unit is repeated several times, and then transferred to a process of treating cesium and strontium that is a general water treatment process.

According to these techniques, tritium that is generally considered to be difficult to be separated is efficiently separated from waste water in a form of a tritium-substituted organic compound, and fixed in forms of tritium-substituted metal salt and alkali metal salt of organic acid and various organic substances substituted by tritium, which are less soluble in water. Due to actions of additives including a radioactive shielding material, an organic substance adsorption material, and a dehydrating aid, such as activated carbon and zeolite, tritium-substituted molecules are held as a whole in stable dehydrated material molecules. Therefore, scattering out of a system by a tritium exchange reaction of molecules containing tritium is unlikely to occur. In this embodiment, tritium is fixed in a form that is easily handled. The tritium can be converted into a tritium-concentrated raw material.

Since the product of this embodiment is easily handled, the product is easily fabricated, for example, solidified with glass, and the product is easily moved to a safe control and storage place that is considered to be appropriate.

Tritium may be changed in a fixed organic compound into various ionized water-soluble compounds by β decay. In this fixation method, tritium is surrounded by the cationic and anionic flocculants and the adsorbent that form counter ions in the vicinity of tritium. For this reason, electric charges are rapidly neutralized, and detachment and adsorption strengths on the adsorbent are rapidly changed to average increased or decreased energy of the organic substance. Therefore, stability is not lost. Accordingly, an assembly of tritium-containing organic substances produced by the method of the present invention is suitable as a form of stably holding tritium.

From conventional studies, it is known that desorption by a procedure using an adsorbent (molecular sieve and activated carbon) in separation of isotope of hydrogen is difficult. In the present invention, this case is ideal, and the difficulty in desorption is advantageous. As the adsorbent used in the present invention, an adsorbent of organic compounds can be widely used. As the adsorbent, activated carbon, zeolite, a molecular sieve, CNT, and CNT nanopeapod can be used (as the molecular sieve is an adsorbent of not only an organic compound but also tritium, CNT is an adsorbent of nanoparticles, and CNT nanopeapod is a material having adsorption performance and X-ray-shielding effect).

When the inorganic flocculant, the cationic flocculant, and the anionic flocculant are each bonded to a compound having counter ions, the ionicity of the bonded compound itself is lost, the bonded compound is made hydrophobic, and resistance to diffusion of re-substitution of tritium is increased. This is very advantageous in prevention of destabilization.

An assembly of a plurality of treatment units that are each the aforementioned reaction route is also an effective configuration of a facility of adjusting a load on a downstream water treatment process. Formation of these treatment units is also within the scope of the method of the present invention.

Accordingly, a continuous treatment for elimination of tritium from a large amount of waste water is actually possible by adjusting the average flow rate to an appropriate flow rate.

INDUSTRIAL APPLICABILITY

In the present invention, which is a device of treating contaminated water containing tritium, even when a nuclide causing radioactive contamination is over a wide range, tritium can be separated and concentrated in safety in terms of operation. Therefore, the device can be built in a short time and systematically controlled at an actual operation site involved in radioactive contamination. Further, control and use of a separated product are possible.

Tritium is discharged and stored as a flocculated substance of radioactive substance contained in a substance having shielding performance. An organic compound and an inorganic salt to be used can be separated at a process of gasifying an organic substance or the like. Therefore, industrial applicability in which characteristics of product in the treatment device that is easily handled and can be treated again are utilized can be exemplified.

Due to ease of an operation and availability of a needed material in the method of the present invention, the industrial applicability is increased.

(1) There are many knowledges of a substitution reaction of tritium with an organic acid. Further, production of a labeled compound as an isotope is known in the medical field. When storage and safety control of a raw material are appropriately performed, the operation is simple, and originally has versatility.

(2) It is known that an appropriate reaction time, drastic stirring, and tight contact in the Wilzbach method in which tritium is brought into contact with an organic compound to label the organic compound are elements of increasing the reaction yield. In a pressurized bubble reactor, this process occurs on an interface of surface of fine bubbles for various organic compounds added for introduction of tritium. In consideration of easy separation in a downstream dissolved air flotation tank in the present invention, a reaction of tritium with an organic compound such as an organic acid, an organic acid alkali salt, a water-soluble amino acid, and a water-soluble amino acid alkali salt that have hydrogen in the α position, as an organic substance, is used from the viewpoints of superiority of production of a hydrophobic compound having foamability. An air-liquid interface imparts orientation to the organic compound. In addition, a reaction condition of tritium labeling is satisfied due to drastic flux. Therefore, an exchange reaction between tritium and hydrogen of the organic compound on the air-liquid interface efficiently proceeds in the pressurized bubble reactor.

(3) It is known that the exchange reaction between tritium and hydrogen of the organic substance is induced by radiation of β ray of tritium at normal temperature. At an actual accident in which an important part is damaged at an atomic power station or the like, it is known that in order to efficiently advance this exchange reaction in fine particles of impurities of an organic substance derived from a generation source, metal hydroxides, and metal oxides, drastic stirring of dangerous substance is effective. In this situation, macro flow and dispersion of fine bubbles and drastic flow in the fine bubbles originally have a stirring effect that does not cause scattering, is safety, and is not influenced by the impurities.

(4) In the Wilzbach method, there are many examples in which a time of reaction of a tritium gas with hydrogen of an organic compound at the same time of stirring is set to several hours to several days of stirring and a product (curie-day) of a tritium concentration and an exposure time is set to a condition of about 1 to 20. However, there is a report in which a considerable amount of tritium-substituted substance is obtained with a target at a test in which the reaction time when a pure substance is used is about 0.1 to 9. An object of the test is to produce a tritium-substituted substance. However, due to a tritium-substituted product other than the target, the reaction yield is decreased. In the method of the present invention, the product is also a tritium-capturing product, and electric charges are neutralized and a hydrophobic substance is produced by the adsorbent and the counter ions during the process, to promote the elimination process. In a conventional report of substitution of an organic substance by tritium through the Wilzbach method, a test at various tritium radioactivity concentrations for an exposure time of about 3 days to 3 weeks are repeated in actual measurement. Lemmon described an example in which a current of about 3 mA is applied to tritium at an AC high voltage of 7 to 1.5 KV and a reaction time is shortened to several minutes. In this case, it is considered that the reaction rate is changed by increase in ionized molecular species. In the present invention, ionized molecular species in the reaction on fine bubbles is also increased, the ionization state in a boundary film of air-liquid interface is enhanced, and the reaction is promoted. Further, stirring by fine bubbles and contact efficiency between the tritium gas and the organic substance on the air-liquid interface are highly increased, and the reaction is promoted in a short time. During development of the Wilzbach method, Lemmon performs as follows. When the ionization state of molecules in the reaction was induced and changed, the efficiency of tritium substitution was increased and the reaction time with tritium was shortened to several minutes. This has an important meaning. However, in the present invention, when this procedure is performed by using the polymer flocculant for molecules having an electric charge, the reaction time in the process is shortened necessarily on the basis of reaction kinetics. The procedure of Lemmon can also be performed in a fine bubble-type Wilzbach reaction tank.

(Susceptibility of Organic Compounds to Toritium Exchange Labering US Department of the Interior Bureau of Mines (1961)

(5) In the method of the present invention, a reaction product with a tritium-substituted carboxylic acid salt, such as an inorganic alkali metal salt, a calcium salt, an inorganic metal salt, causes a structure change resulting in increase in water-insolubility and hydrophobicity. As a result, the reactivity with the inorganic flocculant and the organic flocculant is enhanced, and flocculation and separation extremely easily occur. Thus, the treatment cost is decreased. During this process, cesium salts of the organic acids are formed. However, molecular species thereof are so-called soap in terms of structure. Therefore, the probability of foaming and separating the molecular species is logically high, like salts of the tritium-substituted organic acids.

(6) In the reaction of tritium with the organic compound, various compounds are induced by actions of radicals and ionized molecules induced by radiation of β ray. The reaction has an important advantage in which an organic substance having tritium hydrogen in the molecule can be floated and separated from the following reasons: assembly and reaction of the ionized molecules efficiently occur on fine bubbles; sorption of various kinds of substances is possible due to random sequence and assembly of hydrophobic and polar groups in the molecules of the organic substance; and a state of presence of a field having sorption property can be artificially adjusted by the inorganic flocculant, the cationic polymer flocculant, and the anionic polymer flocculant. Various organic molecular species generated by radiation of β ray are changed into various compounds since the electronic structures thereof mainly belong to organic substances including various radicals, anions, and cations. In the method of the present invention, molecular species of counter ions (inorganic ions, anionic polymer flocculant, and cationic molecular flocculant) are in the vicinity of tritium at the same time of production, and there are many reaction fields on surface of fine bubbles having high stirring effect. Therefore, various organic substances are also supplemented in the inside of flocculated substance. Further, hydrophobic tritium-labeled organic substances having a low molecular weight are also absorbed by the adsorbent and supplemented by the flocculated substance. By these processes, the reaction time can be necessarily shortened and a stable product can be separated.

(7) The tritium-substituted organic acids are not limited to the reaction of (2). An organic compound to form an ester bond resulting in insolubilization in water, a basic organic substance to cause a neutralization reaction with carboxylic acid, or the like can be used. The usable materials are readily available over a wide range and exist in the market. This is advantageous. In the present invention, a process capable of separating various products from waste water by flocculation, adsorption, and hydrophobic separation is used.

(8) Since separation is caused by foam, the separation cost is low. The flocculants and the shielding material that are used in dissolved air flotation separation are all available general-purpose articles, and do not prevent the advance of operations.

(9) By this treatment device, washing water present in the periphery of a facility handling radioactive substances can be treated. The configuration of the treatment device is simple, and the required power is low. Therefore, the treatment device can be easily applied to a treatment of radioactive substances other than tritium.

(10) The treatment device can be applied to a treatment of a tritium-labeled compound including a tritium-labeled organic acid alkali salt, a lithium-labeled amino acid alkali salt, and a tritium-labeled chlorine compound.

(11) According to the method of the present invention, a tritium-labeled organic compound can be concentrated by concentration on a fine interface in a dissolved air flotation treatment. Therefore, the dissolved air flotation treatment can also be applied to a treatment of low-concentration contaminated water. Accordingly, a method capable of treating low-concentration tritium by concentrating extremely-low-concentration tritium-labeled organic compound can be provided. This is also an important advantage of the industrial utility value of the present invention.

REFERENCE SIGNS LIST 1 tritium waste water storage tank
2 tritium waste water supply tank
10 tritium elimination device
20 organic substance mixing device
20A organic substance mixing tank
21 organic acid feeder
22 amino acid feeder
30 substitution reaction device
30A fine bubble-type Wilzbach reaction tank
32 pressurized water tank
34 pressurized water pump
40 flocculation-adsorption reaction device
41 reaction tank for inorganic salt, inorganic alkali metal salt, inorganic metal salt, and inorganic flocculant
42 adsorbent reaction tank for fine powder activated carbon, zeolite, molecular sieve, CNT, and CNT nanopeapod
43 shielding agent mixing reaction tank
44 cationic polymer flocculant reaction tank
45 anionic polymer flocculant reaction tank
46A feeder for inorganic salt, inorganic metal salt, inorganic alkali metal salt, and inorganic flocculant
46B fine powder activated carbon feeder
46C radioactive substance-shielding agent feeder
46D polymer flocculant feeder
46E polymer flocculant feeder
46F anionic activating agent feeder
50 dissolved air flotation separation device
50A dissolved air flotation separation tank
51 pressurized water tank
52 pressurized water pump
53 first unit treated water tank
60 floss treatment device
60A floss flocculation reaction tank
61 floss dehydrator
62 floss dehydrated substance conveyor
63 floss dehydrated substance storage tank
64 floss adjustment tank
65 polymer flocculant feeder
66 polymer flocculant feeder

The invention claimed is:
1. A method for substituting tritium in tritium-containing water comprising:
a process of adding an organic substance having a carboxyl group to tritium-containing water, the organic substance including at least one of an organic acid, an organic acid alkali salt, a water-soluble amino acid, an organic acid to which a water-soluble amino acid alkali salt is added, an organic acid alkali salt, a water-soluble amino acid, and a water-soluble amino acid alkali salt; and a tritium substitution process of circulating fine bubbles in the tritium-containing water in which the organic substance has been added, to enhance an ionization state of ionized molecular species on an air-liquid interface of the fine bubbles and improve contact efficiently between tritium and the organic substance, and causing a reaction of substituting hydrogen in an α position of a carboxylic acid group by tritium in the tritium-containing water, to produce a tritium-substituted product.

2. A method for eliminating tritium from tritium-containing water comprising:

a process of introducing the tritium-containing water containing the tritium-substituted product produced in claim 1 into a flocculation reaction tank, and adding an inorganic salt flocculant to increase insolubility or hydrophobicity of the tritium-substituted product;

a process of further adding a polymer flocculant to flocculate the tritium-substituted product reacted with an inorganic salt; and a process of pouring the flocculated tritium-substituted product into a dissolved air flotation separation tank and stirring the product by pressurized water containing nanobubbles to float and separate the tritium-substituted product by the nanobubbles.

3. The method for eliminating tritium from tritium-containing water according to claim 2, comprising a process of adding the tritium-substituted product and a co-fluocculable radioactive substance-shielding material before addition of the inorganic salt flocculant.

4. The method for eliminating tritium from tritium-containing water according to claim 2, comprising a process of adding the tritium-substituted product and an adsorbent including at least one of co-fluocculable powder activated carbon, powder zeolite, and powder organic substance before addition of the inorganic salt flocculant.

5. The method for eliminating tritium from tritium-containing water according to claim 2, comprising a process of adding a surfactant after addition of the polymer flocculant, to adjust foamability of the tritium-substituted product.

6. The method for eliminating tritium from tritium-containing water according to claim 2, comprising a dehydration-solidification process of dehydrating a floated substance to form a solid.

7. The method for eliminating tritium from tritium-containing water according to claim 3, comprising a process of adding a surfactant after addition of the polymer flocculant, to adjust foamability of the tritium-substituted product.

8. The method for eliminating tritium from tritium-containing water according to claim 4, comprising a process of adding a surfactant after addition of the polymer flocculant, to adjust foamability of the tritium-substituted product.

9. The method for eliminating tritium from tritium-containing water according to claim 3, comprising a dehydration-solidification process of dehydrating a floated substance to form a solid.

10. The method for eliminating tritium from tritium-containing water according to claim 4, comprising a dehydration-solidification process of dehydrating a floated substance to form a solid.

11. The method for eliminating tritium from tritium-containing water according to claim 5, comprising a dehydration-solidification process of dehydrating a floated substance to form a solid.

12. The method for eliminating tritium from tritium-containing water according to claim 7, comprising a dehydration-solidification process of dehydrating a floated substance to form a solid.

13. The method for eliminating tritium from tritium-containing water according to claim 8, comprising a dehydration-solidification process of dehydrating a floated substance to form a solid.

* * * * *